(12) United States Patent
Burke et al.

(10) Patent No.: US 8,352,713 B2
(45) Date of Patent: Jan. 8, 2013

(54) DEBUG CIRCUIT COMPARING PROCESSOR INSTRUCTION SET OPERATING MODE

(75) Inventors: Kevin Charles Burke, Raleigh, NC (US); Brian Michael Stempel, Raleigh, NC (US); Daren Streett, Apex, NC (US); Kevin Allen Sapp, Cary, NC (US); Leslie Mark DeBruyne, Cary, NC (US); Nabil Amir Rizk, Apex, NC (US); Thomas Andrew Sartorius, Raleigh, NC (US); Rodney Wayne Smith, Raleigh, NC (US)

(73) Assignee: QUALCOMM Incorporated, San Diego, CA (US)

( * ) Notice: Subject to any disclaimer, the term of this patent is extended or adjusted under 35 U.S.C. 154(b) by 247 days.

(21) Appl. No.: 11/463,379

(22) Filed: Aug. 9, 2006

(65) Prior Publication Data

US 2008/0040587 A1   Feb. 14, 2008

(51) Int. Cl.
*G06F 9/48* (2006.01)
(52) U.S. Cl. ........................................ 712/227; 712/229
(58) Field of Classification Search ................... 712/227
See application file for complete search history.

(56) References Cited

U.S. PATENT DOCUMENTS

| | | | | |
|---|---|---|---|---|
| 5,481,684 | A | * | 1/1996 | Richter et al. ................ 712/212 |
| 5,574,927 | A | * | 11/1996 | Scantlin ......................... 712/41 |
| 5,638,525 | A | * | 6/1997 | Hammond et al. ........... 712/209 |
| 5,680,620 | A | * | 10/1997 | Ross .............................. 717/129 |
| 5,781,750 | A | * | 7/1998 | Blomgren et al. ............ 712/209 |
| 5,963,737 | A | * | 10/1999 | Mealey et al. ................ 712/244 |
| 6,202,176 | B1 | | 3/2001 | Baldischweiler et al. |
| 6,219,774 | B1 | * | 4/2001 | Hammond et al. ........... 711/202 |
| 6,308,323 | B1 | | 10/2001 | Douniwa |
| 6,356,997 | B1 | * | 3/2002 | Krishnan et al. ............. 712/237 |
| 6,430,674 | B1 | * | 8/2002 | Trivedi et al. ................... 712/43 |
| 6,449,712 | B1 | * | 9/2002 | Irie et al. ...................... 712/227 |
| 6,584,558 | B2 | * | 6/2003 | Hammond et al. ........... 712/244 |

(Continued)

FOREIGN PATENT DOCUMENTS

CN          1613039 A          5/2005

(Continued)

OTHER PUBLICATIONS

International Search Report—PCT/US07/075194, International Search Authority, European Patent Office—Jan. 23, 2008.

(Continued)

*Primary Examiner* — Eric Coleman
(74) *Attorney, Agent, or Firm* — Peter Michael Kamarchik; Nicholas J. Pauley; Jonathan T. Velasco

(57) ABSTRACT

A processor is operative to execute two or more instruction sets, each in a different instruction set operating mode. As each instruction is executed, debug circuit comparison the current instruction set operating mode to a target instruction set operating mode sent by a programmer, and outputs an alert or indication in they match. The alert or indication may additionally be dependent upon the instruction address following within a predetermined target address range. The alert or indication may comprise a breakpoint signal that halts execution and/or it is output as an external signal of the processor. The instruction address at which the processor detects a match in the instruction set operating modes may additionally be output. Additionally or alternatively, the alert or indication may comprise starting or stopping a trace operation, causing an exception, or any other known debugger function.

35 Claims, 3 Drawing Sheets

U.S. PATENT DOCUMENTS

| | | | |
|---|---|---|---|
| 6,609,247 B1* | 8/2003 | Dua et al. | 717/128 |
| 6,631,514 B1* | 10/2003 | Le | 717/137 |
| 6,760,832 B2* | 7/2004 | Nishimoto et al. | 712/24 |
| 6,826,748 B1* | 11/2004 | Hohensee et al. | 717/130 |
| 6,901,583 B1* | 5/2005 | Park | 717/134 |
| 7,013,456 B1* | 3/2006 | Van Dyke et al. | 717/130 |
| 7,017,030 B2 | 3/2006 | Oldfield et al. | |
| 7,065,633 B1* | 6/2006 | Yates et al. | 712/227 |
| 7,137,110 B1* | 11/2006 | Reese et al. | 717/158 |
| 7,149,878 B1* | 12/2006 | Jensen et al. | 712/209 |
| 7,428,727 B2* | 9/2008 | Alverson et al. | 717/134 |
| 7,509,480 B2* | 3/2009 | Jensen et al. | 712/43 |
| 7,757,221 B2* | 7/2010 | Zheng et al. | 717/136 |
| 7,865,948 B1 | 1/2011 | Barnes et al. | |
| 7,958,335 B2* | 6/2011 | Blasco Allue et al. | 712/209 |
| 2002/0116663 A1* | 8/2002 | Wood et al. | 714/30 |
| 2004/0221273 A1* | 11/2004 | Sandham et al. | 717/134 |
| 2006/0004964 A1* | 1/2006 | Conti et al. | 711/136 |
| 2006/0149927 A1 | 7/2006 | Dagan | |

FOREIGN PATENT DOCUMENTS

| | | |
|---|---|---|
| GB | 2374694 | 10/2002 |
| JP | 6202907 A | 7/1994 |
| JP | 2002304291 A | 10/2002 |
| JP | 2003256237 A | 9/2003 |
| RU | 2220443 C2 | 12/2003 |

OTHER PUBLICATIONS

Written Opinion—PCT/US2007/075194, International Searching Authority-European Patent Office-Jan. 23, 2008.

Translation of Office Action in Russian application 2009108321 corresponding to U.S. Appl. No. 11/463,379, citing RU2220443C2, GB2374694, US5680620 and US20060149927 dated Mar. 14, 2011.

* cited by examiner

DEBUG CIRCUIT COMPARING PROCESSOR INSTRUCTION SET OPERATING MODE

FIELD

The present invention relates generally to the field of processors and in particular to a system and method of debugging code on a processor via a debugging circuit that includes consideration of the processor instruction set operating mode.

BACKGROUND

Modern processors are extremely complicated systems. Most modern processors employ a pipelined architecture, where sequential instructions, each having multiple execution steps, are overlapped in execution. Many processors, known as "superscalar" processors, include two or more separate pipelines for parallel instruction execution. To avoid stalls in the pipeline due to branch instructions, most processors employ various forms of branch prediction, with speculative fetching and execution of instructions when branches are predicted taken. To improve performance, many modern processors separate logical register addresses from the corresponding physical memory storage registers, known as register renaming. To provide programs the illusion of unlimited, fast memory, many processors execute code in a virtual address space, translating addresses to one or more physical address spaces as data traverses a memory hierarchy (e.g., register, cache, main memory). With such complexity, the execution of code within a modern processor is very difficult to accurately track and validate. In particular, anomalies may be very hard to debug.

In addition, the software that executes on modern processors is itself extremely complex. With of the advent of Reduced Instruction Set Computing (RISC) processor architectures, much of the computational and logical complexity of computing migrated from processor instructions to optimizing compilers. That is, compilers build complex operations from a relatively small set of processor instructions, each of which is optimized for a particular, specific function. This results in a more lengthy and complex sequence of instructions, including, e.g., logical, arithmetic, load/store, and branch operations, for a given computational task. Such complex code can be difficult to debug when errors cause anomalous program behavior.

To assist in the daunting task of debugging complex code executing on a complex processor, debugging tools are built into many processors. These may comprise address and data comparators for identifying specific instructions and/or data patterns. The debug tools may additionally include address range comparators, so that the debugging or tracing may be limited to predetermined code segments. Other debug tools may include counters, sequencers, and the like, to provide flexibility in specifying the conditions that specify breakpoints and/or trace triggers. Trace information may be provided off-chip, such as via a dedicated bus, or may be stored in a dedicated on-chip buffer. Breakpoints may trigger one or more external signals, such as to arm and/or trigger a logic analyzer or illuminate an LED; may cause an exception, branching code execution to a debugging routine; or may simply halt execution, allowing the contents of various registers and caches to be inspected. These debugging tools, which are not utilized during normal processor execution, are designed into the processor circuits in such a way as to minimize impact on processor performance and power consumption.

Programmers may explicitly set the proper instruction set operating mode in software, prior to executing instructions according to the relevant instruction set encoding. However, errant software may at times branch to a particular instruction address that was intended to be executed while in one instruction set operating mode, but while the processor is actually in some other instruction set operating mode. In such a case, the processor may attempt to execute the instruction at that address using the improper instruction set decoding, leading to incorrect results.

For example, some versions of the ARM processor architecture include at least two instruction set operating modes: a 32-bit ARM mode and a 16-bit Thumb mode. Table 1 lists a code snippet of ARM instructions:

TABLE 1

| ARM mode instruction encoding | | |
|---|---|---|
| 000096F0 | cpy | r4, r0 |
| 000096F4 | bl | 0xA8A0 |
| 000096FC | cpy | r1, r4 |
| 00009700 | ldr | r0, [r0, #0x8] |

Table 2 lists the same code interpreted in Thumb mode:

TABLE 2

| Thumb mode instruction encoding | | |
|---|---|---|
| 000096F0 | and | r0, r0 |
| 000096F2 | b | 0x9A36 |
| 000096F4 | lsl | r1, r5, #0x11 |
| 000096F6 | add.w | r0, r0, r4, lsl #0x4 |
| 000096FA | b | 0x9A3E |
| 000096FC | lsl | r0, r1, #0x0 |
| 000096FE | b | 0x9222 |
| 00009700 | and | r0, r2 |

Note, in particular, the branch instructions at 96F2, 96FA, and 96FE. Due to erratic branching, it may be difficult to ascertain the point at which an error caused the ARM code of Table 1 to be interpreted in Thumb mode as in Table 2, and hence to debug the error. This difficulty arises because prior art debug circuits do not include the processor instruction set operating mode as an input to the logic that triggers breakpoints, initiates traces, and of the like.

Most processors that support two or more operating "modes," such as supervisor and user modes, or real and protected modes, switch between the modes by causing an exception and branching to a mode switching routine. This operation is easily detected using prior art debugging tools and software by setting a breakpoint or beginning a trace on the instruction address of the mode switching routine. A processor switching instruction set operating modes without causing an exception is one example of code behavior that is difficult to diagnose with prior art debugging tools, that do not include the processor instruction set operating mode as a consideration in triggering breakpoints, initiating traces, and the like.

SUMMARY

According to one or more embodiments, a debug circuit in a processor operative to execute two or more instruction sets identifies the address at which the processor switches from one instruction set operating mode to a different instruction set operating mode, and outputs an alert or indication of the mode switch. The alert or indication may comprise a breakpoint signal that halts execution and/or is output as an external signal of the processor. The instruction address at which the processor switches instruction set operating modes may additionally be output. Alternatively, the alert or indication may comprise starting or stopping a trace operation, causing an exception, or any other known debugger function.

One embodiment relates to a method of debugging software code comprising a plurality of instructions on a processor having at least two different instruction set operating modes. A target instruction set operating mode is received prior to executing any code instructions. Code instructions are executed and, for each instruction executed, the current processor instruction set operating mode is compared to the target instruction set operating mode. An alert is triggered if the current processor instruction set operating mode matches the target instruction set operating mode.

Another embodiment relates to a method of executing software on a processor having at least first and second instruction set operating modes. The address at which the processor switches from the first instruction set operating mode to the second instruction set operating mode is identified, and an alert is triggered in response to the identification.

Yet another embodiment relates to a processor operative to execute instructions according to two or more instruction set encodings, each in a different instruction set operating mode. The processor includes a current instruction set operating mode indicator and a data storage location operative to store a target instruction set operating mode indicator. The processor also includes an execution unit operative to execute instructions according to a current instruction set operating mode and a compare circuit operative to compare the current instruction set operating mode to the target instruction set operating mode upon executing each instruction, and to output an indication if the current instruction set operating mode matches the target instruction set operating mode.

Still another embodiment relates to a processor operative to execute two or more instruction set encodings, each in a different instruction set operating mode. The processor includes a compare circuit operative to detect a change in the instruction set operating mode and to output an indication of the instruction set operating mode change, and the instruction address at which the change occurs, in response to the detection.

DETAILED DESCRIPTION

Figure 1:
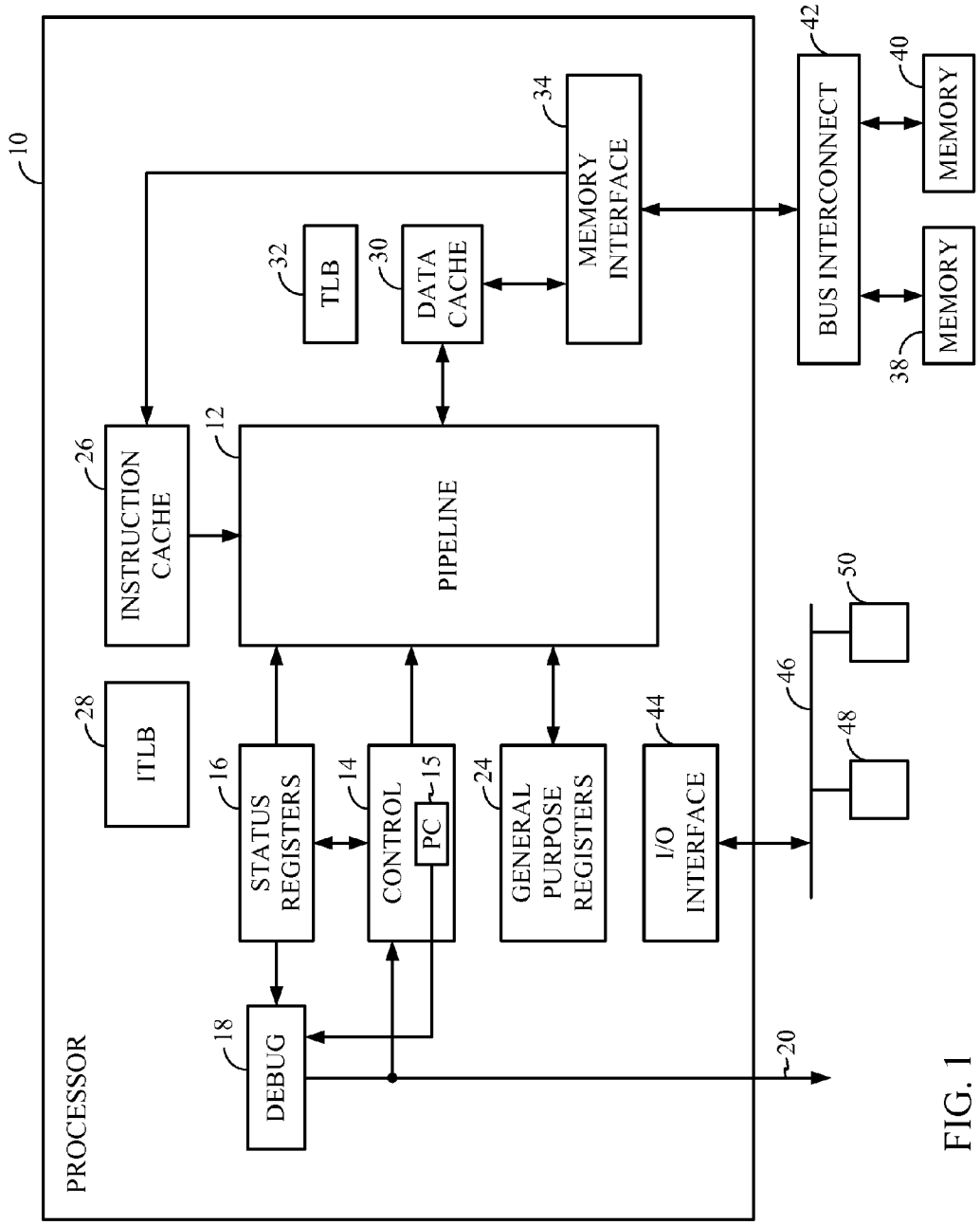
FIG. 1 is a functional block diagram of a processor.

FIG. 1 depicts a functional block diagram of a processor 10. The processor 10 executes instructions in an instruction execution pipeline 12 according to control logic 14. The control logic 14 maintains a Program Counter (PC) 15, and sets and clears bits in one or more status registers 16 to indicate, e.g., the current instruction set operating mode, information regarding the results of arithmetic operations and logical comparisons (zero, carry, equal, not equal), and the like. In some embodiments, the pipeline 12 may be a superscalar design, with multiple, parallel pipelines. The pipeline 12 may also be referred to as an execution unit. A General Purpose Register (GPR) file 20 provides registers accessible by the pipeline 12, and comprising the top of the memory hierarchy.

The processor 10, which executes instructions from at least two instruction sets in different instruction set operating modes, additionally includes a debug circuit 18, operative to compare, upon the execution of each instruction, at least a predetermined target instruction set operating mode to the current instruction set operating mode, and to provide an indication of a match between the two. The debug circuit 18 is described in greater detail below.

The pipeline 12 fetches instructions from an instruction cache (I-cache) 26, with memory address translation and permissions managed by an Instruction-side Translation Lookaside Buffer (ITLB) 28. Data is accessed from a data cache (D-cache) 30, with memory address translation and permissions managed by a main Translation Lookaside Buffer (TLB) 32. In various embodiments, the ITLB 28 may comprise a copy of part of the TLB 32. Alternatively, the ITLB 28 and TLB 32 may be integrated. Similarly, in various embodiments of the processor 10, the I-cache 26 and D-cache 30 may be integrated, or unified. Misses in the I-cache 26 and/or the D-cache 30 cause an access to main (off-chip) memory 38, 40 by a memory interface 34. The memory interface 34 may be a master input to a bus interconnect 42 implementing a shared bus to one or more memory devices 38, 40. Additional master devices (not shown) may additionally connect to the bus interconnect 42.

The processor 10 may include an Input/Output (I/O) interface 44, which may be a master device on a peripheral bus, across which the I/O interface 44 may access various peripheral devices 48, 50. Those of skill in the art will recognize that numerous variations of the processor 10 are possible. For example, the processor 10 may include a second-level (L2) cache for either or both the I and D caches 26, 30. In addition, one or more of the functional blocks depicted in the processor 10 may be omitted from a particular embodiment. Other functional blocks that may reside in the processor 10, such as a JTAG controller, instruction predecoder, branch target address cache, and the like are not germane to a description of the present invention, and are omitted for clarity.

Figure 2:
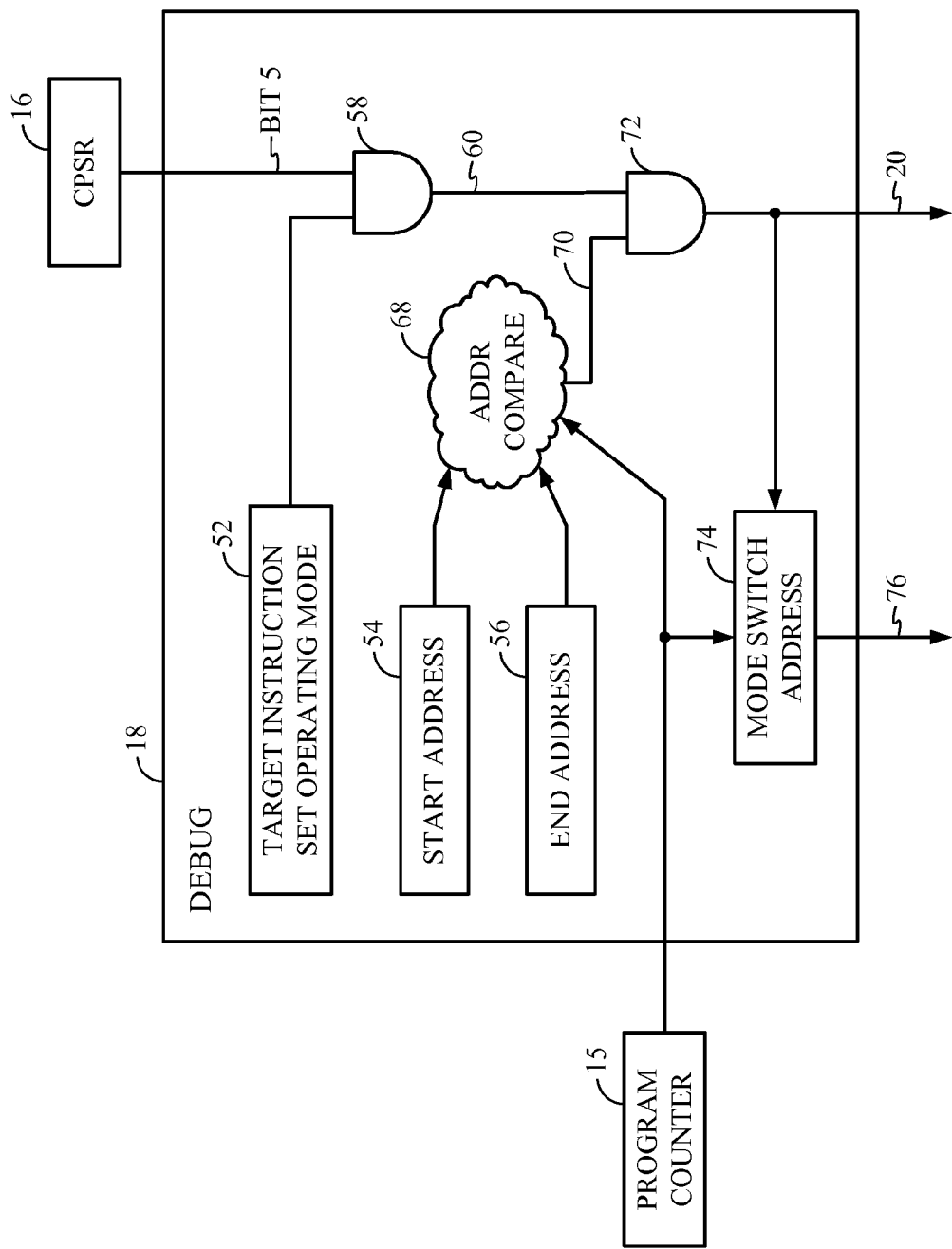
FIG. 2 is a functional block diagram of a processor pipeline, including a debug circuit.

FIG. 2 depicts a functional block diagram of one embodiment of the debug circuit 18. The debug circuit 18 includes a target instruction set operating mode register 52, an address range start address register 54, and an address range end address register 56. The registers 52, 54, 56 are loaded by programmers via diagnostic software prior to a diagnostic/debug operation. The value written to the target instruction set operating mode register 52 is compared to the current processor instruction set operating mode during the execution of each instruction, to trigger a breakpoint, trace function, or other alert. The values of the start and end address registers 54, 56, are the beginning and end, respectively, of the target address range over which the debug circuit 18 is to monitor for a match between the current and target instruction set operating modes.

As of those of skill in the art will readily recognize, the debug circuit 18 may include additional customizable parameters, and additional functional blocks, enabling breakpoints, traces, and the like to trigger on a wide variety of conditions. These have been omitted from FIG. 2 for clarity, but in general may include all debug circuit parameters and functionality known in the art.

Prior to a diagnostic/debug run, a programmer loads the start and end address registers 54, 56 to define a target address region, which may range from a single address to the entire address range of the code being tested. In other embodiments, multiple start and end address registers may be provided to define a plurality of target address ranges. The programmer additionally loads the target instruction set operating mode register 52. For example, in the case of an ARM processor executing code entirely in ARM mode, a programmer may load register 52 with a value indicating Thumb mode, to set a breakpoint causing the debug circuit 18 to halt execution, for example, if the processor 10 executes in the instruction within the address range defined by registers 54, 56 in Thumb mode.

During the diagnostic/debug operation, the value stored in the target instruction set operating mode register 52 is compared to a status register bit indicating the current instruction set operating mode of the processor 10 in comparison logic such as the AND gate 58. For example, in an ARM processor 10, bit 5 of the Current Program Status Register (CPSR) 16 may be monitored. The output 60 of the comparison logic 58 will be asserted only when the current instruction set operating mode of the processor 10 matches the instruction set operating mode indicated by the target instruction set operating mode register 52.

In embodiments where the processor 10 executes instructions from more than two instruction sets in different instruction set operating modes, the target instruction set operating mode register 52 and mode indicator bits of the CPSR (or other status register) 16 will comprise multi-bit values, and the comparison logic 58 may include additional circuits such as decoders. In various embodiments, other indications of the current instruction set operating mode may be utilized in lieu of the CPSR 16, such as the output of instruction decoding logic.

Simultaneously, the current value of the PC 15 is compared to the address range registers 54, 56 in address comparison logic 68. The output 70 of the address comparison logic 68 is asserted whenever the current value of the PC 15 falls within the target address range. In various embodiments, indications of the "current" instruction address may vary from the PC 15, as required or desired. For example, the address comparison circuit 68 may compare the address of instructions in a decode stage of the pipeline 12, an execute stage, or any other pipeline stage. Additionally, a more dynamic address may be used, such as the address of the last instruction in the pipeline 12 to commit to execution.

The output 70 of the address comparison logic 68 is ANDed with the output 60 of the instruction set operating mode indicator comparison logic 58 at AND gate 72, to generate an output 20 indicating a day match between the current and target instruction set operating modes occurring within the target address range. In one embodiment, the output 20 is provided as an output to the processor (see FIG. 1). This output 20 may arm and/or trigger a logic analyzer, illuminate an LED, or trigger some other action or alarm. In one embodiment, as depicted in FIG. 1, the instruction set operating mode match indicator output 20 may comprise an input to the controller 14, to halt execution of the processor 10.

In one embodiment, the instruction set operating mode match indicator output 20 may initialize or terminate an instruction trace operation, with the trace information being directed to output pins of the processor 10 or stored in an on-chip trace buffer (not shown). In one embodiment, as depicted in FIG. 2, the instruction set operating mode match indicator output 20 may trigger an instruction set operating mode match address register 74, capturing the value of the PC 15, and hence the address of the instruction at which may match is detected between the current and target instruction set operating modes. This may be of particular value in detecting a change from one instruction set operating mode to another. The output 76 of this register 74 may be routed to pins of the processor 10 for external inspection.

In one embodiment, the instruction set operating mode match indicator output 20 may cause an exception, branching code execution to a predefined routine. This instruction set mode match routine may, for example, read the instruction set operating mode match address register 74. In general, the instruction set operating mode match indicator output 20 may trigger any known debugger operation, as required or desired.

Figure 3:
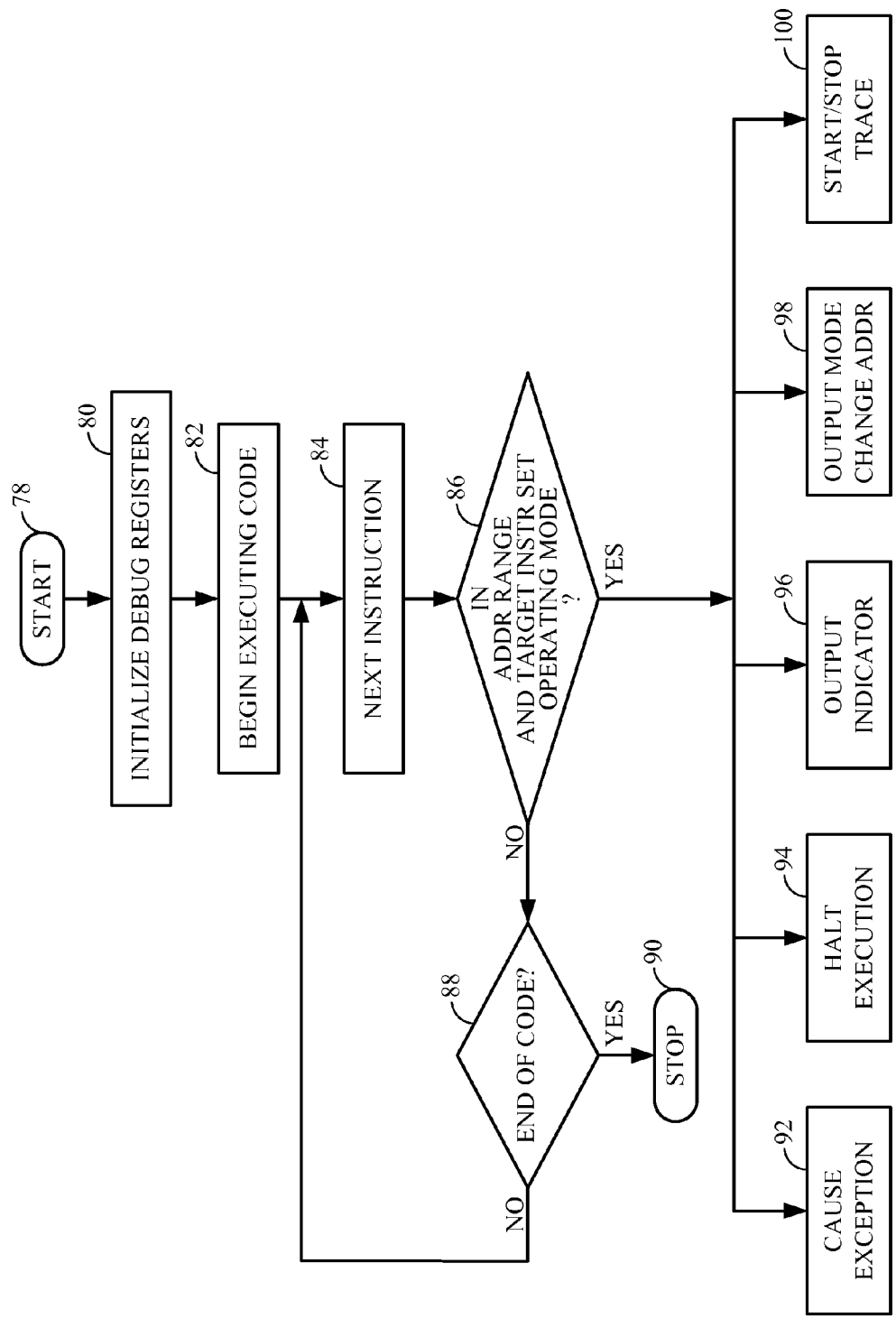
FIG. 3 is a flow diagram of a diagnostic/debug process.

FIG. 3 depicts a method of debugging code according to one or more embodiments of the present invention. Starting at block 78, a programmer initializes the debug circuit registers (block 80). This may comprise, for example, loading the target instruction set operating mode register 52, and setting a target address range by loading the start address register 54 and end address register 56. Additional debug circuit registers (not shown) may be initialized, as required or desired.

The programmer then begins execution of the code to be debugged (block 82), successively fetching and executing the next instruction (block 84) in the code sequence. Regardless of the address, if the current instruction set operating mode of the processor 10 does not match that set by the programmer in the target instruction set operating mode register 52 (block 86), then the next instruction is fetched and executed (block 84) until the end of the code to be debugged (block 88), in which case the method stops at block 90.

If, upon executing an instruction (block 84), the instruction address is within the predetermined address range, and the current instruction set operating mode matches that set by the programmer in the target instruction set operating mode register 52 (block 86), then the debug circuit asserts output 20 and may take any number of actions, as specified by the programmer.

For example, the debug circuit output 20 may cause the processor 10 to take an exception, branching code execution to an instruction set operating mode match routine (block 92). The debug circuit output 20 may cause the pipeline controller 14 to halt execution (block 94), allowing the programmer to inspect the contents of various registers, cache lines, and the like. The debug circuit 18 may assert the output 20 externally (block 96), which may be used to arm or trigger a logic analyzer, light an LED, or the like. The debug circuit 18 may additionally output the instruction set operating mode match address for external inspection (block 98). The debug circuit 18 may start or stop a trace operation (block 100). Although depicted as alternatives, the debug circuit 18 may, in a given embodiment, execute two or more of blocks 92-96. In general, the debug circuit 18 may take any action known in the art to be beneficial to debugging code on the processor 10, having detected a match between the current instruction set operating mode and the target instruction set operating mode.

As used herein, the term "instruction set" refers to a set of encodings by which instruction data (e.g., the contents of an I-cache line) are interpreted by a processor 10 as executable instructions. The term "instruction set operating mode" refers to an identifiable mode of operation of the processor 10 in which instruction data are interpreted according to a particular instruction set encoding. In particular, "instruction set operating mode" is distinguished from known processor operating "modes" relating to permissions (e.g., supervisor versus user mode), memory addressing (e.g., real versus protected mode), and the like.

Although the present invention has been described herein with respect to particular features, aspects and embodiments thereof, it will be apparent that numerous variations, modifications, and other embodiments are possible within the broad scope of the present invention, and accordingly, all variations, modifications and embodiments are to be regarded as being within the scope of the invention. The present embodiments are therefore to be construed in all aspects as illustrative and not restrictive and all changes coming within the meaning and equivalency range of the appended claims are intended to be embraced therein.

What is claimed is:

1. A method of debugging software code comprising a plurality of instructions on a processor having at least two different instruction set operating modes, each mode for executing instructions of a different instruction set, comprising:
receiving a target instruction set operating mode corresponding to a target instruction set prior to executing any code instructions;
executing code instructions and, for each instruction executed, comparing the current processor instruction set operating mode, corresponding to the current instruction set, to the target instruction set operating mode, wherein the current instruction set and the target instruction set have at least one common instruction address; and
triggering an alert if the current processor instruction set operating mode matches the target instruction set operating mode.

2. The method of claim 1 wherein the alert comprises halting instruction execution.

3. The method of claim 1 wherein the alert comprises controlling a trace operation.

4. The method of claim 1 wherein the alert comprises causing an exception.

5. The method of claim 1 wherein the alert comprises outputting a signal indicative of a match between the current processor instruction set operating mode and the target instruction set operating mode.

6. The method of claim 1 wherein the alert comprises outputting the address of the instruction for which the current processor instruction set operating mode matches the target instruction set operating mode.

7. The method of claim 1 further comprising:
receiving a target address range prior to executing any code instructions;
for each instruction executed, comparing the current instruction address to the target address range; and
triggering the alert only if the current processor instruction set operating mode matches the target instruction set operating mode and the current instruction address is within the target address range.

8. A method of executing software on a processor having at least first and second instruction set operating modes, for executing instructions of a first and second instruction set respectively, comprising: each mode for executing instructions of a different instruction set, comprising:
identifying the address at which the processor switches from the first instruction set operating mode to the second instruction set operating mode, wherein the first and second instruction sets have at least one common instruction address; and
triggering an alert in response to the identification.

9. The method of claim 8 wherein the alert comprises halting instruction execution.

10. The method of claim 8 wherein the alert comprises controlling a trace operation.

11. The method of claim 8 wherein the alert comprises causing an exception.

12. The method of claim 8 wherein the alert comprises outputting a signal indicative of a change in instruction set operating mode.

13. The method of claim 8 wherein the alert comprises outputting the address of the instruction identified.

14. The method of claim 8 wherein identifying the address at which the processor switches from the first instruction set operating mode to the second instruction set operating mode comprises identifying the address only if it falls within a predetermined address range.

15. A processor operative to execute instructions of two or more instruction sets, according to two or more instruction set encodings, each in a different instruction set operating mode, comprising:
a current instruction set operating mode indicator configured to indicate a current instruction set operating mode for executing a current instruction set;
a data storage location operative to store a target instruction set operating mode indicator; configured to indicate a target instruction set operating mode for executing a target instruction set, wherein the current instruction set and the target instruction set have at least one common instruction address;
an execution unit operative to execute instructions according to a current instruction set operating mode; and
a compare circuit operative to compare the current instruction set operating mode to the target instruction set operating mode upon executing each instruction, and to output an indication if the current instruction set operating mode matches the target instruction set operating mode.

16. The processor of claim 15 wherein the indication comprises a signal operative to halt instruction execution.

17. The processor of claim 15 wherein the indication comprises a signal operative to control a trace operation.

18. The processor of claim 15 wherein the indication comprises a signal operative to cause an exception.

19. The processor of claim 15 wherein the indication comprises a signal indicating that the current instruction set operating mode matches the target instruction set operating mode.

20. The processor of claim 15 wherein the indication comprises the address of the instruction being executed when a match is detected between the current instruction set operating mode and the target instruction set operating mode.

21. The processor of claim 15 further comprising a data storage location operative to store a target address range, and wherein the compare circuit is operative to output an indication only if the current instruction set operating mode matches the target instruction set operating mode and the address of the instruction currently being executed falls within the target address range.

22. A processor operative to execute instructions of two or more instruction sets having at least one common instruction address, according to two or more instruction set encodings, each in a different instruction set operating mode, comprising:
a compare circuit operative to detect a change in the instruction set operating mode and to output an indication of the instruction set operating mode change, and the instruction address at which the change occurs, in response to the detection.

23. The processor of claim 22 wherein the indication comprises a signal operative to halt instruction execution.

24. The processor of claim 22 wherein the indication comprises a signal operative to control a trace operation.

25. The processor of claim 22 wherein the indication comprises a signal operative to cause an exception.

26. The processor of claim 22 wherein the indication comprises a signal indicative of a change in instruction set operating mode.

27. The processor of claim 22 wherein the indication comprises the instruction set operating mode change address.

28. The processor of claim 22 wherein the compare circuit detects a change in the instruction set operating mode only when the instruction address at which the change occurs falls within a predetermined address range.

29. A processor operative to execute instructions of two or more instruction sets having at least one common instruction address, according to two or more instruction set encodings, each in a different instruction set operating mode, comprising:
 means for detecting a change in the instruction set operating mode and to output an indication of the instruction set operating mode change, and the instruction address at which the change occurs, in response to the detection.

30. The processor of claim 29 wherein the indication comprises one of a signal operative to halt instruction execution, a signal operative to control a trace operation, a signal operative to cause an exception, a signal indicative of a change in instruction set operating mode, a signal operative to control a trace operation, and the instruction set operating mode change address.

31. The processor of claim 29 wherein the means for detecting detects a change in the instruction set operating mode only when the instruction address at which the change occurs falls within a predetermined address range.

32. The method of claim 1, wherein an instruction set architecture used to encode, decode and execute instructions in the current processor instruction set operating mode is different from an instruction set architecture used to encode, decode and execute instructions in the target instruction set operating mode.

33. The method of claim 8, wherein an instruction set architecture used to encode, decode and execute instructions in the first instruction set operating mode is different from an instruction set architecture used to encode, decode and execute instructions in the second instruction set operating mode.

34. The processor of claim 15, wherein an instruction set architecture used to encode, decode and execute instructions in the current processor instruction set operating mode is different from an instruction set architecture used to encode, decode and execute instructions in the target instruction set operating mode.

35. A non-transitory computer-readable storage medium comprising code, which, when executed by a processor having at least first and second instruction set operating modes corresponding to a first and second instruction set respectively, causes the processor to perform operations for tracking a switch in the instruction set operating modes, the non-transitory computer-readable storage medium comprising:
 code for identifying the address at which the processor switches from the first instruction set operating mode to the second instruction set operating mode, wherein the first and second instruction sets have at least one common instruction address; and
 code for triggering an alert in response to the identification.

* * * * *